United States Patent [19]

Henricks

[11] Patent Number: 5,094,076
[45] Date of Patent: Mar. 10, 1992

[54] TORQUE CONVERTER REACTOR ASSEMBLY AND METHOD

[75] Inventor: Scott W. Henricks, Wheeling, Ill.

[73] Assignee: MacLean-Fogg Company, Mundelein, Ill.

[21] Appl. No.: 614,926

[22] Filed: Nov. 16, 1990

[51] Int. Cl.⁵ ............................................. F16D 33/00
[52] U.S. Cl. ...................................... 60/345; 29/889.5; 264/275
[58] Field of Search ................ 29/889.5; 264/265, 275, 264/254, 259, 271.1, 272.2, 328.2, 328.3; 60/345, 340, 330, 341, 342, 343, 346, 344; 415/188, 185, 208.2, 915, 200

[56] References Cited

U.S. PATENT DOCUMENTS

| | | | |
|---|---|---|---|
| 2,764,099 | 9/1956 | Wernert | 415/200 |
| 2,858,675 | 11/1958 | Schneider | 60/345 |
| 3,187,072 | 6/1965 | Morin | 264/242 |
| 3,271,845 | 9/1966 | Breher | 264/242 |
| 3,314,644 | 4/1967 | Dwyer et al. | 264/242 |
| 3,829,238 | 8/1974 | Speck | 415/200 |
| 3,978,181 | 8/1976 | Vahle | 264/46.7 |
| 4,117,677 | 10/1978 | Murakami et al. | 60/345 |
| 4,260,576 | 4/1981 | Pollard | 264/257 |
| 4,296,063 | 10/1981 | Sendo et al. | 264/273 |
| 4,379,104 | 4/1983 | Koorevaar | 264/275 |
| 4,944,908 | 7/1990 | Levegue et al. | 264/265 |
| 4,953,353 | 9/1990 | Lederman | 60/345 |

*Primary Examiner*—Edward K. Look
*Assistant Examiner*—Hoang Nguyen
*Attorney, Agent, or Firm*—Mason, Kolehmainen, Rathburn & Wyss

[57] ABSTRACT

A torque converter reactor includes a monolithic body of plastic resin having a hub and radially extending vanes terminating in an outer rim. A clutch with metal parts is partly encapsulated in the hub during a molding operation. The clutch is preheated to accommodate the resin shrink rate, and shut off plates keep the interior of the clutch free of plastic material.

13 Claims, 2 Drawing Sheets

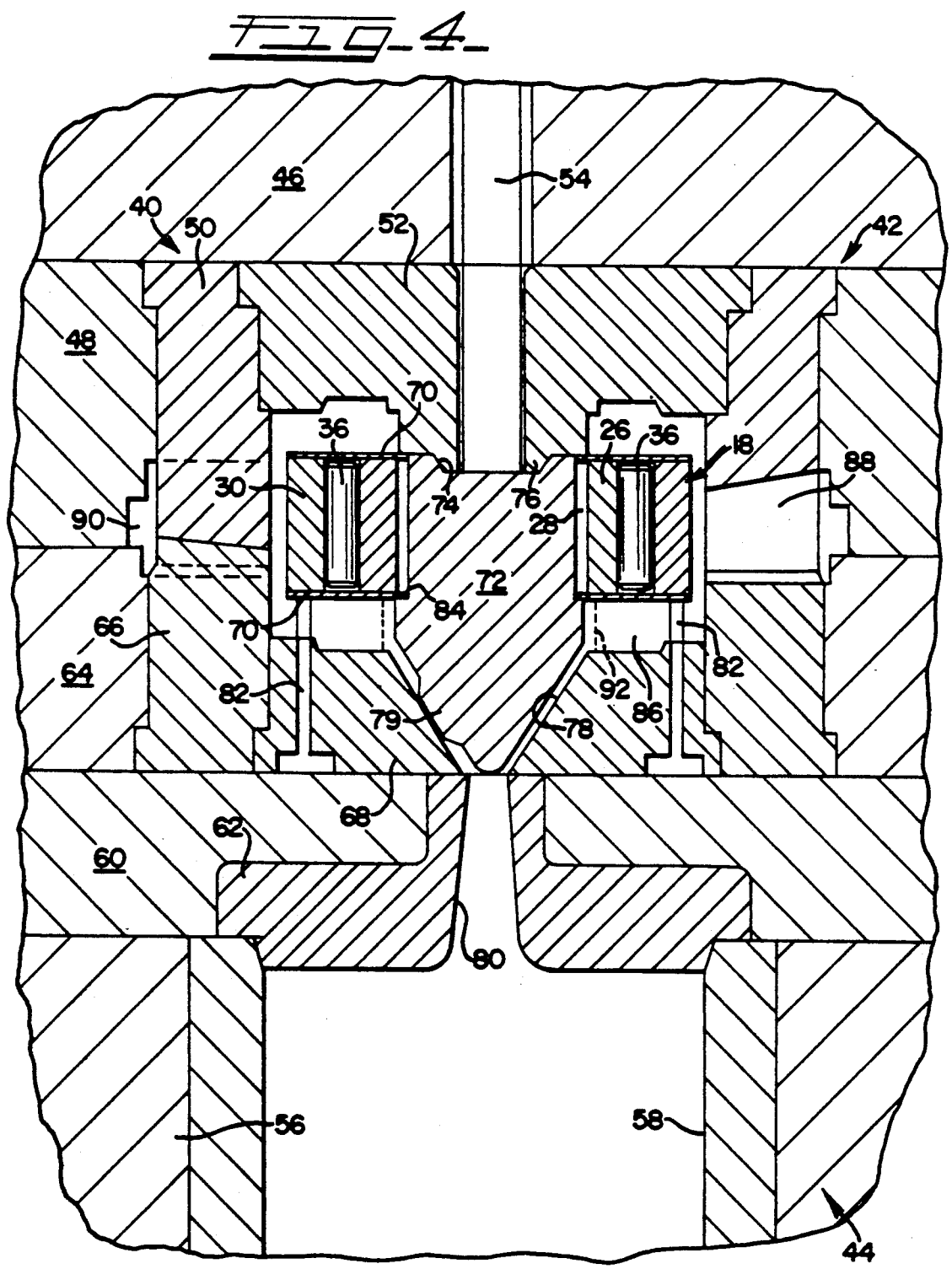

TORQUE CONVERTER REACTOR ASSEMBLY AND METHOD

FIELD OF THE INVENTION

The present invention relates to a torque converter reactor or similar assembly having a monolithic plastic resin body including a hub and radial vanes with a rotary assembly such as a clutch with a plurality of metal parts captured within the hub, and to a method for making the asembly.

DESCRIPTION OF THE PRIOR ART

Torque converters have long been used in the transmission power trains of automotive vehicles and for other purposes. A typical fluid torque converter includes three functional elements: an impeller driven by a power input shaft, a turbine for driving a power output shaft and a reactor or stator that is fixed or stationary during normal torque multiplication operation. Fluid acting between these elements causes the output shaft to rotate in response to rotation of the input shaft with a varying torque-speed ratio. A typical reactor or stator includes a central portion or hub, an outer portion or rim, and fluid deflecting blades or vanes extending between the hub and rim. A central rotary assembly in the form of a clutch is provided so that at some shaft speeds the reactor can freewheel for increased efficiency when continued torque multiplication is not required.

Plastic resin materials are becoming more widely used in automotive vehicles in place of metal because of factors such as lighter weight, ease of molding and improved performance. It would be desirable to use plastic resin in place of metal in the reactor element of a torque converter assembly. One known torque converter assembly includes a molded plastic hub with fluid vanes molded integrally around the outer hub. An outer rim of metal is fixed to the outer ends of the vanes. A clutch assembly is assembled into the hub, and is retained by a molded plastic retainer that also fits into the hub. This structure has been successful for its intended purpose, but is subject to disadvantages because it includes a number of parts that must be manufactured individually and then assembled together to make the reactor assembly.

A torque converter reactor assembly of this type is one example of a structure in which a molded plastic body such as a hub portion is assembled together with a complex rotary assembly including several metal parts. Although it may be desirable to form the molded plastic body as a monolithic structure capturing or encapsulating the rotary assembly, there are problems that must be overcome. One problem is that during the molding step, the rotary assembly must be accurately and securely positioned relative to the mold and the plastic material. Another is that the plastic material must be kept from flowing into or interfering with the rotary assembly. Yet another problem is that the plastic material shrinks when it cures, and this can lead to an improper fit or undesirable forces between the plastic material and the rotary assembly.

SUMMARY OF THE INVENTION

Among the objects of the invention are to provide a method for making a torque converter reactor made partly of plastic that requires no assembly after molding of the plastic; to provide a method in which a rotary assembly, such as a clutch, can be molded into the hub of a monolithic body of plastic without plastic entering the clutch during molding; to provide a method in which the shrink rate of the plastic upon curing is compensated for; and to provide a torque converter reactor or the like in which a rotary assembly such as a clutch is captured in a hub portion by portions of a monolithic plastic boby.

In brief, in accordance with the present invention, there is provided a method for making a torque converter reactor or similar structure of the type including a hub, a rotary assembly with a plurality of metal parts at the hub and radial vanes extending from the hub. In carrying out this method, the rotary assembly is preheated and then placed inside a mold having freely interconneted portions for forming the hub and vanes. The rotary assembly is located centrally within the hub forming portion of the mold. The freely interconnected mold portions are filled substantially simultaneously with a heated charge of plastic resin to form the hub vanes as one continuous plastic resin structure. The plastic resin structure is permitted to cure into a unitary, monolithic body having the rotary assembly captured within the hub.

Further in accordance with the invention, there is provided a torque converter reactor or the like including a monolithic body of plastic resin material having a central hub, an outer rim and radial vanes extending from the hub to the rim. A rotary assembly has a plurality of metal parts. The hub includes a central recess and the rotary assembly is located in the central recess. The monolithic body includes portions surrounding the periphery of the assembly and overlying at least part of the opposite sides of the assembly for capturing the assembly within the hub.

BRIEF DESCRIPTION OF THE DRAWINGS

The present invention may be best understood by reference to the folowing detailed description of the embodiment of the invention shown in the accompanying drawings, wherein:

FIG. 4 is a sectional view of mold tooling for making the torque converter reactor.

DETAILED DESCRIPTION OF THE PREFERRED EMBODIMENT

Figure 1:
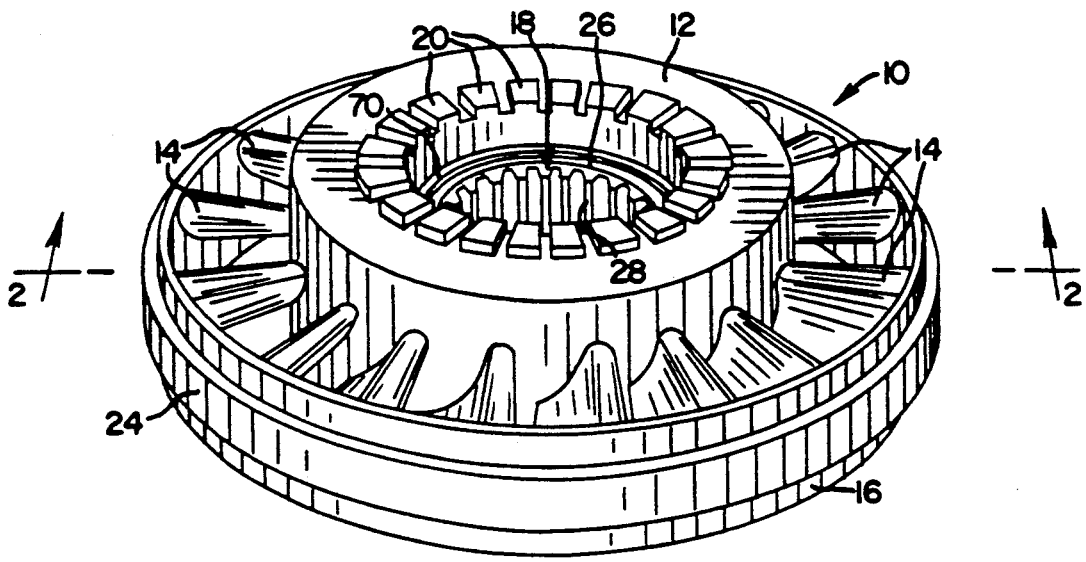
FIG. 1 is a prespective view of a torque converter reactor of the present invention made by the method of the present invention.
Figure 2:
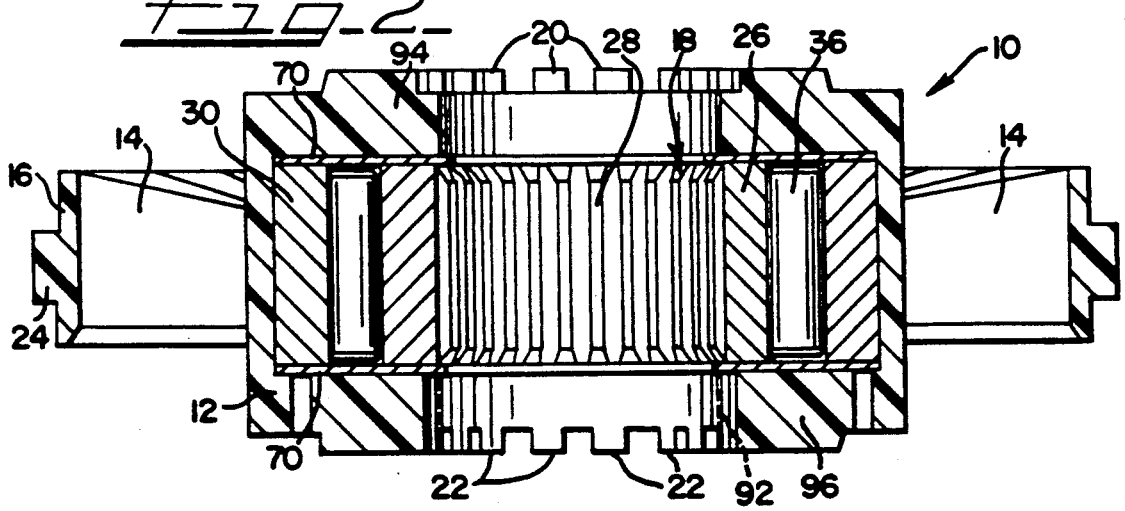
FIG. 2 is a sectional view of the torque converter reactor taken along the line 2—2 of FIG. 1.

Referring now to the drawings, a torque converter reactor or stator generally designated as 10 and constructed in accordance with the principles of the present invention is shown in FIGS. 1 and 2. The reactor includes a central hub portion 12 and a number of vanes 14 extending radially outward from the hub portion. The outer ends of the vanes 14 intersect an outer rim portion 16 of the reactor 10. The hub portion 12, vanes 14 and rim portion 16 are parts of a single, monolithic body 17 of molded plastic resin material. Captured in a central location in the hub portion 12 is a rotary assembly 18 which, in the illustrated embodiments of the invention, is a clutch assembly.

The term "monolithic" is used to describe a unitary and one-piece structure that is essentially made throughout of one homogeneous and uninterrupted material, as distinguished from structures that are made of distinct discrete components that may be attached together by fasteners or adhesives or the like.

When the reactor or stator 10 is assembled with an impeller and turbine in a fluid torque converter (not shown), the vanes 14 defect fluid moving in the torque converter. Hub portion 12 includes oppositely directed integral lugs 20 and 22 forming castles acting as thrust washers for holding the reactor in a normally fixed position in an automotive vehicle power train between the engine and the transmission. The outer rim 16 includes a projecting flange 24 and serves to strengthen and locate the outer ends of the vanes 14.

Figure 3:
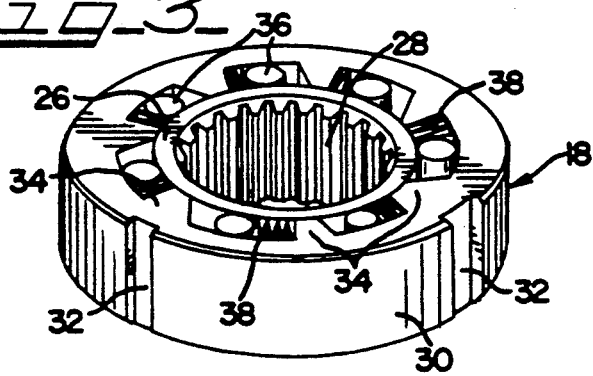
FIG. 3 is a perspective view of the freewheeling clutch assembly of the torque converter reactor.

The rotary assembly 18 is a clutch that is also shown in FIG. 3. It includes a number of ferrous metal parts including an inner race 26 having internal splines 28 and an outer race 30 having keying slots 32. Projections 34 on the outer race 30 define tapered pockets in which are located clutch rollers 36 and springs 38. Normally the rollers 36 lock the inner and outer races 26 and 30 together and the reactor 10 is in a fixed or stationary position. Under certain operating conditions, the clutch 18 permits the reactor 10 to freewheel and the outer race 30 can move relative to the inner race 26 for more efficient operation when torque multiplication is not needed. Principles of the present invention are applicable to rotary assemblies other than the specific clutch seen in the drawings. For example, bearing assemblies or other types of power transmission or rotation coupling assemblies can be mounted to a hub section of a structure like the reactor 10.

In accordance with the invention, the monolithic body 17 is made with the rotary assembly 18 in place in the mold tooling generally designated as 40 and seen in FIG. 4. This tooling includes upper and lower tooling assemblies 42 and 44 shown in the closed position ready to begin a molding cycle. The upper assembly 42 includes an upper plate 46 and upper backing plate 48 supporting an upper vane core 50 and top side castle core 52. A cone ejection pin 54 reciprocates in guide openings in the upper plate 50 and core 52. Lower tooling assembly 44 includes a lower plate 56 surrounding a transfer pot 58 and supporting a backing plate 60 carrying a sprue bushing 62. Another backing plate 64 mates with the upper backing plate 48 and supports a lower vane core 66 and bottom castle core 68. The upper and lower tooling assemblies separate when the mold tooling is open to provide access to the interior of the mold.

A pair of material shut off plates 70 are located at the opposite sides of the rotary assembly 18 to prevent the flow of plastic resin material into the region between the races 26 and 30 during molding. As can be seen in FIG. 2, the plates 70 remain in place in the reactor 10 after molding. Each plate 70 is a thin, annular disk with an inner periphery overlying the inner race 26 without blocking the splines 28 and an outer periphery overlying the outer race 30.

A transfer cone 72 is held in a precisely determined position in the mold tooling 40 between the castle cores 52 and 68. A recess 74 in the top of the cone 72 registers with a projection 76 on the core 52 surrounding a passage 78 for the ejection pin 54. The bottom of cone 72 is generally conical and includes standoffs 79 that fit into a conical opening extending through the lower core 68 from the sprue bushing inlet 80. A conical flow passage is defined between the cone 72 and the bottom castle core 68 arround the standoffs 79 leading from the transfer pot 58 and sprue bushing 62 to the interior of the mold tooling 40.

Transfer cone 72 acts together with a number of positioning pins 82 to accurately position the rotary assembly 18 in the mold. Cone 72 includes a step 84 upon which the assembly and the plates 70 rest when the assembly 18 is placed over the cone 72. With the cone in place in the mold, the rotary assembly 18 is radially positioned at the center of the reactor 10. Pins 82 are held by the bottom castle core and support the lower shut off palte 70 for positioning the rotary assembly in the axial direction.

The mold tooling 40 defines a region 86 between the top side and bottom castle cores 52 and 68 for forming the hub portion 12. A region 88 between the upper and lower vane cores 50 and 66 forms the vanes 14. A region 90 between the backing plates 48 and 64 forms the rim portion 16. Each of these regions is unobstructed and freely communicates with the others for simultaneous formation of the monolithic body 17 in the tooling 40.

In the manufacture of the reactor 10 in accordance with the present invention, the rotary assembly 18 is preheated to an elevated temperature related to the shrink rate of the material of body 17 when it cures. A heat resistant, thermosetting plastic resin, specifically a phenolic resin such a s thirty five percent fiberglass filled Grade RX865 phenolic resin available from Rogers Corporation, is presently preferred. This material has a shrink rate of about two and one-half thousandths of an inch per inch during curing. To accommodate this shrinkage, the rotary assembly is preheated to about three hundred thirty degrees F so that it will contract an equivalent amount when it cools to the ambient temperature. Preferably the rotary assembly together with the shut off plates 70 is preheated in place on the transfer cone 72.

A charge of plastic resin is heated to a molding temperature of about two hundred thirty degrees F and loaded into the transfer pot 58. After preheating, the cone 72, plates 70 and assembly 18 are located into the mold tooling 40 and the tooling is closed. The rotary assembly 18 is accurately positioned by the cone 72 and pins 82. A transfer pressure of about five thousand pounds per square inch is applied to the resin in the transfer pot 58 and the material flows through the sprue bushing 62 and into the mold cavity regions 86, 88 and 90.

The plastic resin is permitted to cure in the mold for about sixty seconds. Then the mold is opened and the reactor 10 is removed from the mold by a knock out system including the ejection pin 54. At this point, the reactor 10 is complete, but the transfer cone 72 is attached to the reactor by cured plastic resin. The cone is separated from the reactor by removing plastic material in the region shown by broken line 92 in FIGS. 2 and 4. The cone 72 may be reused in making subsequent reactors 10.

The dimensional change in the plastic resin as it cures is similar to the dimensional change in the preheated metal parts of the rotary assembly 18 as it cools. Thus the assembly 18 fits properly in the hub portion 12 of the monolithic body 17. The plastic material surrounds the outer periphery of the assembly 18, and portions 94 and 96 of the body 17 overlie opposed sides of the assembly 18 so that the assembly is partly encapsulated in the desired position. No further assembly operations are required, and following the molding operations, the reactor 10 is handled and installed as a single component.

I claim:

1. A method for making a torque converter reactor including a hub, a rotary assembly with a plurality of metal parts at the hub and radial vanes extending from the hub, said method comprising the steps of:
   preheating the rotary assembly;
   placing the preheated rotary assembly inside a mold having freely interconnected portions for forming the hub and vanes;
   said placing step including locating the rotary assembly centrally within the hub forming portion of the mold;
   filling the freely interconnected mold portions substantially simultaneously with a heated charge of plastic resin to form the hub and radial vanes as one continuous plastic resin structure; and
   permitting the plastic resin structure to cure into a unitary, monolithic body having the rotary assembly captured within the hub.

2. A method as claimed in claim 1 further comprising the step of masking portions of the preheated rotary assembly within the mold.

3. A method as claimed in claim 2 wherein said masking step includes covering exposed side portions of the rotary assembly with shut off plates prior to said filling step, and leaving the shut off plates in place in the completed product.

4. A method as claimed in claim 3 wherein said locating step includes fixing the rotary assembly in place with locating pins engaging at least one said shut off plate.

5. A method as claimed in claim 1 wherein said locating step includes fixing the rotary assembly in place with locating pins.

6. A method as claimed in claim 1, said plastic resin being a high temperature, resilient thermosetting polymeric material.

7. A method as claimed in claim 6, said thermosetting polymeric material being a phenolic resin.

8. A method as claimed in claim 1 wherein said preheating step comprises increasing the temperature of the rotary assembly to a temperature causing thermal expansion corresponding to the shrink rate of the plastic resin material upon curing.

9. A method as claimed in claim 8, the plastic resin being thermosetting phenolic, the rotary assembly including ferrous material, and said preheating step including raising the temperature of the rotary assembly to more than about 300 degrees F.

10. A method as claimed in claim 1, said mold including a portion for forming a rim at the outer ends of the vanes.

11. A method as claimed in claim 1, said preheating step including mounting the rotary assembly on a mold tooling component and heating both said component and assembly, and said locating step including fitting said mold tooling component in a predetermined place in the mold with the rotary assembly mounted thereon.

12. A method as claimed in claim 11, further comprising the step of separating the mold tooling component from the monolithic body after curing by severing part of the plastic material.

13. A torque converter reactor made in accordance with the method of claim 1.

* * * * *